United States Patent
Li et al.

(10) Patent No.: US 7,640,453 B2
(45) Date of Patent: Dec. 29, 2009

(54) METHODS AND APPARATUS TO CHANGE A CONFIGURATION OF A PROCESSOR SYSTEM

(75) Inventors: Yufu Li, Shanghai (CN); Jian Tang, Shanghai (CN); XiaoHua Cai, Shanghai (CN); Murugasamy Nachimuthu, Hillsboro, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 11/618,422

(22) Filed: Dec. 29, 2006

(65) Prior Publication Data

US 2008/0162982 A1 Jul. 3, 2008

(51) Int. Cl.
*G06F 11/00* (2006.01)
(52) U.S. Cl. ............................ 714/10; 713/1
(58) Field of Classification Search ............ 713/1; 714/3, 10, 49; 718/1, 100
See application file for complete search history.

(56) References Cited

U.S. PATENT DOCUMENTS

| | | | | |
|---|---|---|---|---|
| 4,970,640 | A * | 11/1990 | Beardsley et al. ............ 710/104 |
| 5,664,195 | A * | 9/1997 | Chatterji ..................... 717/178 |
| 5,694,617 | A * | 12/1997 | Webb et al. ................... 710/40 |
| 6,119,219 | A * | 9/2000 | Webb et al. .................. 712/227 |
| 6,122,732 | A * | 9/2000 | Ahuja ........................... 713/1 |
| 6,243,809 | B1 * | 6/2001 | Gibbons et al. ................ 713/1 |
| 6,457,135 | B1 * | 9/2002 | Cooper ....................... 713/323 |
| 6,618,805 | B1 * | 9/2003 | Kampe ........................... 713/1 |
| 6,789,214 | B1 * | 9/2004 | De Bonis-Hamelin et al. ... 714/15 |
| 6,934,725 | B1 * | 8/2005 | Dings ........................ 707/204 |
| 6,961,761 | B2 * | 11/2005 | Masuyama et al. ........... 709/220 |
| 7,051,215 | B2 * | 5/2006 | Zimmer et al. .............. 713/300 |
| 7,146,497 | B2 * | 12/2006 | Almeida et al. ............. 713/100 |
| 7,178,014 | B2 * | 2/2007 | Nalawadi et al. ............... 713/1 |
| 7,373,494 | B2 * | 5/2008 | Martinez et al. ............... 713/1 |
| 7,379,418 | B2 * | 5/2008 | Korb et al. .................. 370/216 |
| 2002/0184345 | A1 * | 12/2002 | Masuyama et al. ........... 709/220 |
| 2004/0210890 | A1 * | 10/2004 | Armstrong et al. ........... 717/168 |
| 2004/0228359 | A1 * | 11/2004 | Korb et al. .................. 370/406 |
| 2004/0255171 | A1 * | 12/2004 | Zimmer et al. .............. 713/300 |
| 2005/0278708 | A1 * | 12/2005 | Zhao et al. .................. 717/136 |
| 2006/0010450 | A1 * | 1/2006 | Culter ........................ 718/104 |
| 2006/0031851 | A1 * | 2/2006 | Laird et al. ................. 719/320 |
| 2006/0212660 | A1 * | 9/2006 | Mattina ...................... 711/146 |
| 2007/0016766 | A1 * | 1/2007 | Richmond et al. ........... 713/100 |
| 2007/0130484 | A1 * | 6/2007 | Martinez et al. ............. 713/300 |
| 2007/0150713 | A1 * | 6/2007 | Almeida et al. ................ 713/1 |
| 2007/0255934 | A1 * | 11/2007 | Dennis ......................... 713/1 |
| 2008/0040524 | A1 * | 2/2008 | Zimmer et al. .............. 710/267 |
| 2008/0115138 | A1 | 5/2008 | Nachimuthu et al. |
| 2008/0147945 | A1 * | 6/2008 | Zimmer et al. .............. 710/260 |
| 2009/0077553 | A1 * | 3/2009 | Tang et al. .................. 718/100 |

* cited by examiner

*Primary Examiner*—Robert Beausoliel
*Assistant Examiner*—Joshua P Lottich
(74) *Attorney, Agent, or Firm*—Hanley, Flight & Zimmerman, LLC

(57) ABSTRACT

Methods and apparatus to change a configuration of a processor system are disclosed. An example disclosed method calculates system configuration data during a non-quiesce state of a processing system, stores information based on the calculated system configuration data in a data buffer during the non-quiesce state of the processing system, and extracts information from the data buffer to update the configuration of the processing system while the processing system is in a quiesce state.

19 Claims, 6 Drawing Sheets

METHODS AND APPARATUS TO CHANGE A CONFIGURATION OF A PROCESSOR SYSTEM

FIELD OF THE DISCLOSURE

The present disclosure relates generally to processor systems and, more particularly, to methods and apparatus to change a configuration of a processor system.

BACKGROUND

The speed of business moves at an ever increasing rate due to the use of server computer systems. Furthermore, a down or halted server computer system may force a business to halt a critical system, which can cause large losses in productivity. Therefore, a server computer system requires high levels of reliability, availability and serviceability (RAS) features.

Typically, to enable implementation of RAS features, a server computer system needs to be reconfigurable. In many cases, RAS-related operations require changes to the system configuration such as, for example, adding memory, removing memory, adding a processor, removing a processor and recovering from failures while the operating system (OS) is running (i.e., in an OS transparent manner).

Some known server computer systems or processor systems provide an interrupt or OS cycle stealing mechanism that enables the OS to be put into a quiescent state (i.e. quiesces the OS) so that certain RAS features can be implemented (e.g., so that the system configuration can be changed) while the OS is running. In some of these known systems, the interrupt mechanism is referred to as a system management interrupt (SMI). However, due to real-time demands, the OS imposes system management interrupt (SMI) latency limitations. In other words, the OS limits the amount of time for which the OS can be held in a quiescent state to prevent or avoid compromising critical business services, OS timer tick loss, video and/or audio glitches, interprocess timeouts, etc. In addition, if errors occurred and are not detected during the calculation and update process, then the change in system configuration can not be referred back to an original state causing the system to become unstable.

DETAILED DESCRIPTION

In general, the example methods and apparatus described herein split the change or updating of a processor system configuration (e.g., a server computer system configuration change or update) into a plurality of stages or phases. In one described example, the computationally intensive and time-intensive calculations associated with generating new or updated configuration data or information are performed by an interrupt event handler using one or more system management interrupt cycles while the processor system is in a non-quiesce state. The generated configuration information is stored in a data buffer in the order in which it is generated or calculated. When the calculations associated with the new or updated configuration data are complete, a signal (e.g., a flag is set) initiates a second stage or phase during which a configuration update handler forces the processor system into a quiesce state, extracts the new or updated configuration previously stored in the buffer, applies (e.g., instantiates) the new or updated configuration data, and releases the processor system from the quiesce state to resume normal operation under the new or updated configuration data. In this manner, the processor system is only forced to remain in the quiesce state for the second stage or phase, thereby significantly decreasing the amount of quiesce time required to implement a processor system configuration change or update while the OS is running. Such a reduced quiesce time requirement can also significantly improve the scalability of a common system interface (CSI) type processor systems or platforms.

Figure 1:
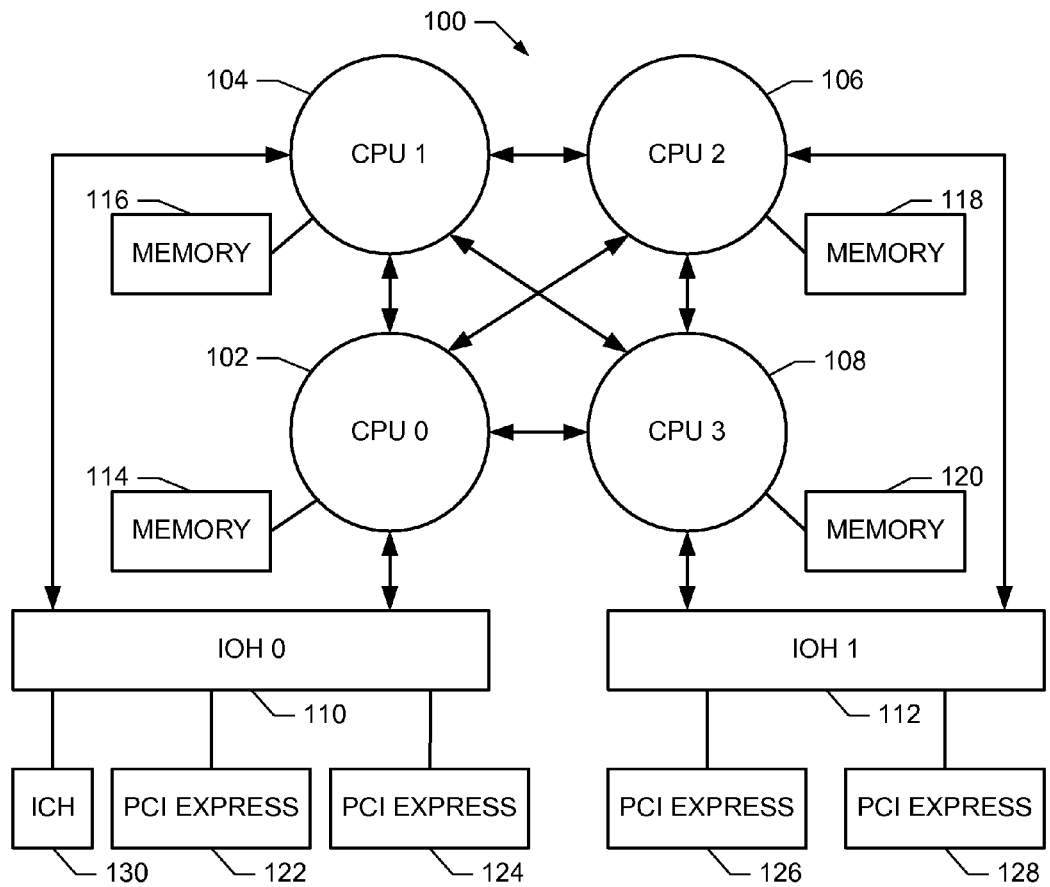
FIG. 1 is an example of a processor system having a point-to-point link based interconnection architecture.

Before providing a more detailed description of examples of the apparatus and methods generally outlined above, a brief description of a point-to-point link based interconnection architecture (FIG. 1) and a known technique to change or update the configuration of a processor system (FIG. 2) such as that shown in FIG. 1 are first provided. The example in FIG. 1 is a common system interface (CSI) link-based system 100 having four processors or processing units 102, 104, 106, and 108 and two input/output hubs (IOH's) 110 and 112. In addition, each of the processors 102, 104, 106, and 108 is operatively coupled to a respective memory controller 114, 116, 118, and 120. The IOH's 110 and 112 provide connectivity to input/output (I/O) devices such as PCI Express 122, 124, 126, and 128 and I/O controller hubs (ICH's) such as, for example, the ICH 130.

Communication among the processors 102, 104, 106, and 108 and communication between the processors 102, 104, 106, and 108 and the IOH's 110 and 112 are implemented using CSI packets. Each of the CSI components (e.g., the processors 102, 104, 106, and 108, the IOH's 110 and 112, etc.) contains a routing table (RT) and a source address decoder (SAD). The RT provides the CSI packet routing information to other sockets, and the SAD provides a mechanism to represent routing of the resources such as memory, I/O, etc.

As is known, to implement configuration changes within the system 100 of FIG. 1 (e.g., to improve or change RAS features), forcing the various CSI components of the system 100 into a quiesce state is typically required. For example, if the processor 108 in the FIG. 1 is to be removed for service while the OS of the system 100 is running, the RT's and SAD's associated with the remaining CSI devices (e.g., the processors 102, 104, and 106 and the IOH's 110 and 112) should be reconfigured so that the entries related to the processor 108 and the memory 120 coupled to the processor 108 are removed, thereby eliminating the possibility of the system 100 attempting to route information to the processor 108 and/or its memory 120 while the processor 108 is removed for service.

Figure 2:
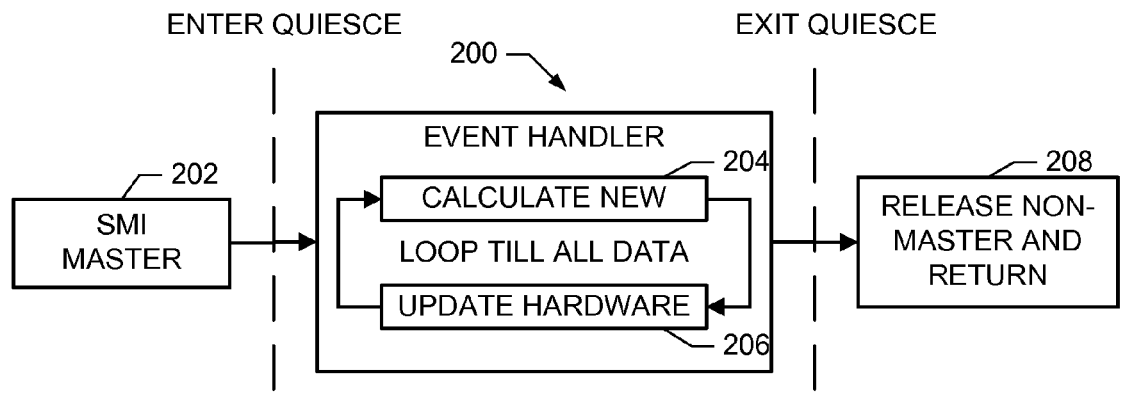
FIG. 2 depicts known technique to change a processor system configuration.

The CSI components of the system 100 depicted in FIG. 1 support a quiesce (i.e., a quiescent) mode in which normal communications or traffic can be stopped to enable the RT and SAD change operations needed to carry out a configuration change or update. FIG. 2 depicts a known technique to implement a configuration change or update within a processor system such as the example system 100 of FIG. 1. Continuing with the example involving the removal of the processor 108, when the processor 108 is to be removed from the system 100, a system management interrupt (SMI) is generated. In response to the SMI, one of the remaining processors (e.g., 102, 104, or 106) is selected as the master or monarch (depicted as processor 202 in FIG. 2) and is responsible to perform most, if not all, of the operations needed to complete the configuration change or update. In particular, the master processor 202 quiesces the whole system 100 and carries out the operations of an interrupt event handler 200. When performing the operations of the interrupt event handler 200, the master processor 202 calculates, for example, new system configuration register information or values at block 204 and updates the hardware devices of the system 100 by, for example, updating the RT's and SAD's associated with the CSI devices to remain active in the system 100 at block 206. The calculations and updating associated with blocks 204 and 206 are performed until all required changes to the configuration data are calculated and instantiated within the associated hardware devices.

While the master processor 202 carries out the operations of the interrupt event handler 200, the various CSI devices making up the system 100 are maintained in a quiesce state. When the operations of the interrupt event handler 200 are complete, the master processor 202 releases the devices held in a quiesce state at block 208. As noted above, maintaining the CSI devices (e.g., the processors 102, 104, and 106) in a quiesce state for the duration of the calculation of the changed or updated configuration data in addition to the time required to update or change the configuration of the devices by instantiating the changed or updated configuration data, can result in violating the latency limitations associated with the system 100 which, in turn, can cause various failures and/or difficulties within the system 100 such as, for example, excessive interruption of critical business services, timer tick loss, video and/or audio glitches, inter-process timeouts, etc. Additionally, if errors are detected in the course of the event handler 200 calculating and updating hardware, the system 100 may become unstable because it may not be possible to roll back the configuration data to its original state before the updating began.

Figure 3:
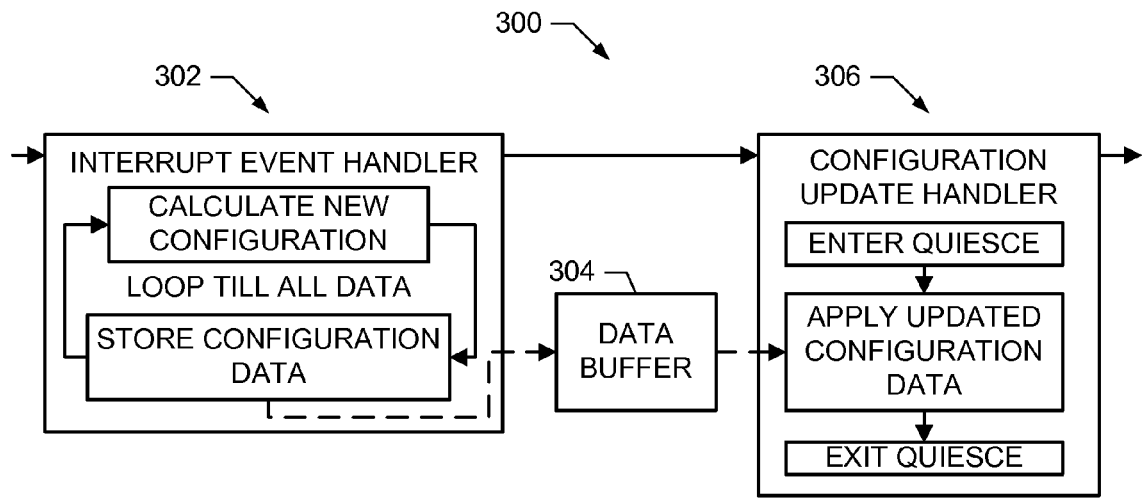
FIG. 3 is a block diagram depicting an example apparatus and method to reconfigure a processor system.

FIG. 3 is a block diagram depicting an example apparatus and method to reconfigure a processor system such as the processor system 100 of FIG. 1. Turning in detail to FIG. 3, the example apparatus includes an interrupt event handler 302, a data buffer 304, and a configuration update handler 306, one or more of which may be implemented via code or software stored on a computer readable medium and executed by a processor such as, for example, one of the processors 102, 104, 106, or 108. For example, one or more integrated circuits, discrete semiconductor components, or passive electronic components may be used. Additionally or alternatively, some or all of the blocks of the example apparatus 300, or parts thereof, may be implemented using instructions, code, and/or other software and/or firmware, etc. stored on a machine accessible medium that, when executed by, for example, a processor system (e.g., the example processor system 610 of FIG. 6), perform the operations represented in the flow diagram of FIGS. 4 and 5.

Figure 4:
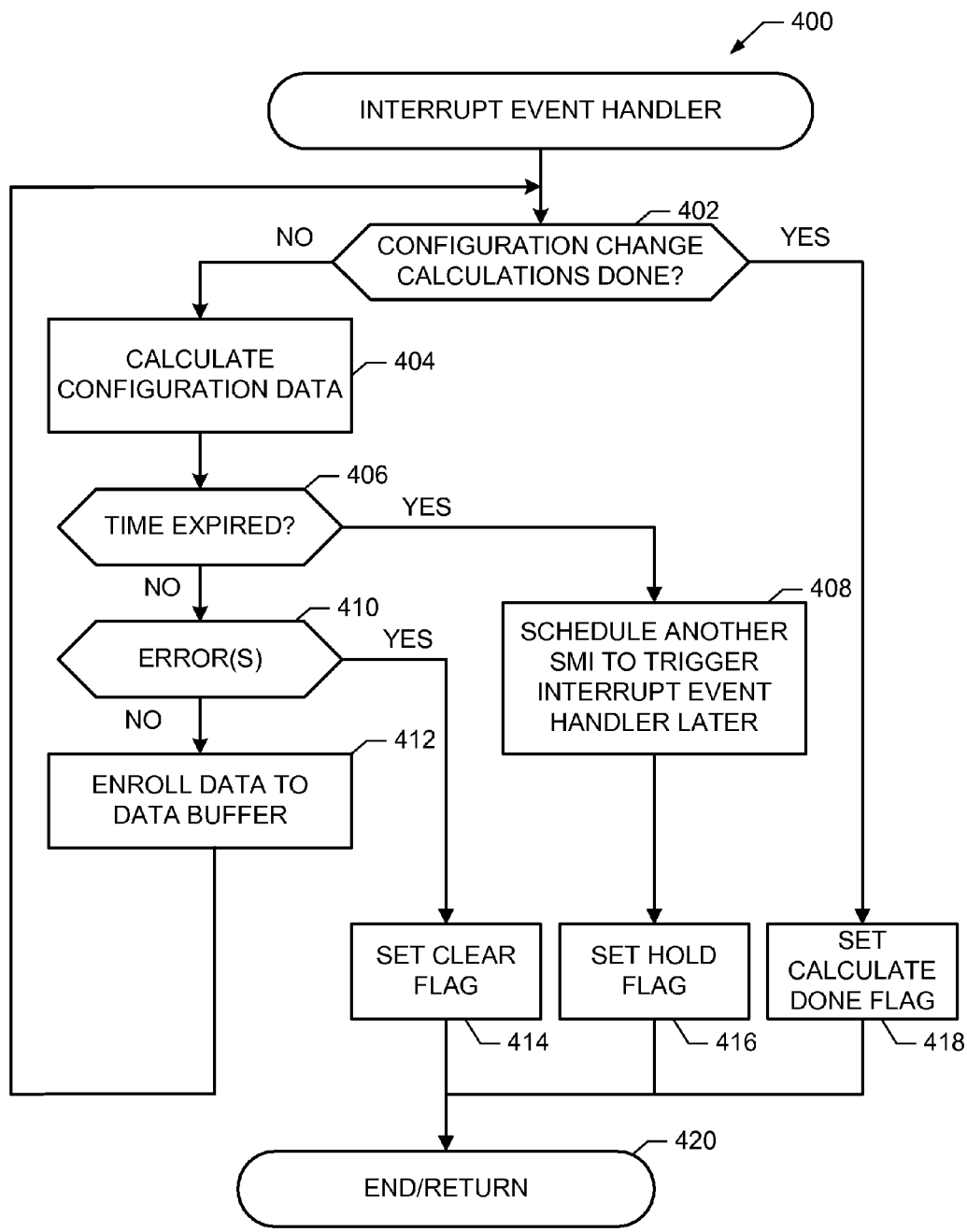
FIG. 4 is a flowchart depicting an example process that may be performed by the example interrupt event handler of FIG. 3.
Figure 5:
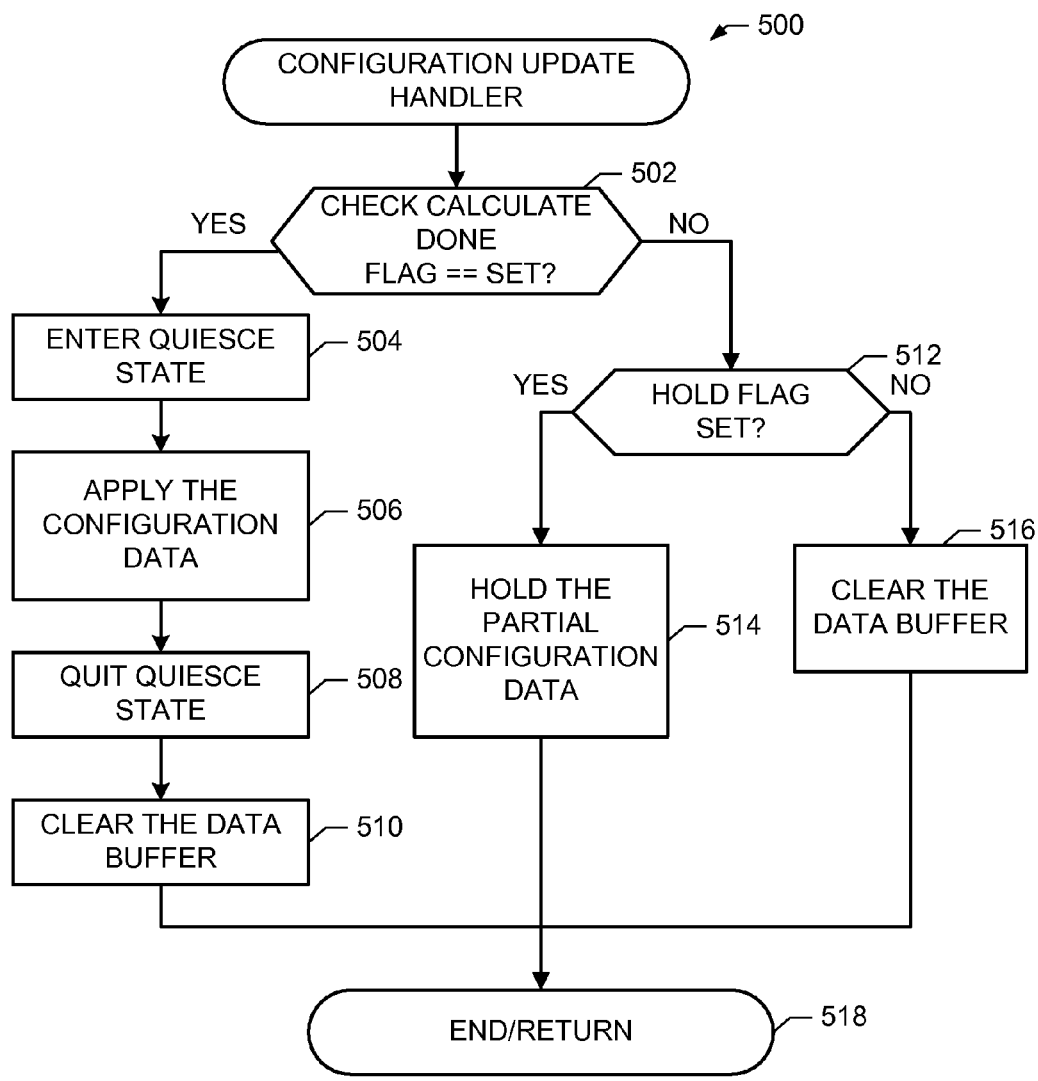
FIG. 5 is a flowchart depicting an example process that may be performed by the example configuration update handler of FIG. 3.

To clearly illustrate the differences between the example technique depicted in FIG. 3 and the known technique depicted in FIG. 2, the foregoing example involving the removal of the processor 108 from the system 100 will be used in describing the operations carried out when employing the technique depicted in FIG. 3 and the related flowcharts shown in FIGS. 4 and 5. In general, as depicted in FIG. 3, in response to an SMI, the event handler 300, which may be implemented by one of the remaining processors 102, 104, or 106 designated as a master or monarch processor, calculates new or updated configuration information or data and stores it in the data buffer 304 while the system 100 and its CSI components are in a non-quiesce state. Prior to the lapse of a predetermined time period (e.g., a maximum latency time for servicing an interrupt while the OS is running), the interrupt event handler 302 ceases its calculations and storage operations and returns control to the OS. If further calculations and storage operations are needed to complete the generation of new or updated configuration information or data (i.e., the first predetermined time period was insufficient to complete all calculations required), the interrupt event handler 302 schedules another SMI and returns control to the OS. When the scheduled interrupt triggers another SMI, the interrupt event handler 302 continues from where it left off and, thus, resumes its calculations and buffer storage operations until complete or until yet another predetermined time period elapses. The process of calculating and storing the new or updated configuration data continues until complete and uses one or more SMI generated time periods, none of which exceed the latency limitations of the system 100.

When the interrupt event handler 302 has completed its calculations and storage operations so that all of the new or updated configuration information or data needed to change the configuration of the system 100 is stored in the buffer 304, the interrupt event handler 302 generates a signal (e.g., sets a flag) indicating that the contents of the buffer 304 are ready to be applied to the hardware devices of the system 100.

The configuration update handler 306 is responsive to the signal from the interrupt event handler 302 indicating that the contents of the buffer 304 are complete and ready to be applied to the hardware. In particular, when the signal indicates that the contents of the buffer 304 are complete and ready to be applied to the hardware of the system 100, the configuration update handler 306 forces the CSI components of the system 100 (e.g., the non-master processors remaining after the processor 108 is removed, the IOH's 110 and 112, etc.) into a quiesce state, extracts the new or updated configuration data stored in the buffer 304 in the order in which it was stored or enrolled in the buffer 304, and then releases or exits the quiesce state. Thus, as can be appreciated from the foregoing, the processor system configuration change or update technique depicted in the example of FIG. 3 does not hold devices in a quiesce state during the relatively lengthy configuration data calculation processes and, instead, only holds devices in a quiesce state for the relatively short amount of time needed to apply the configuration data, which typically does not violate the latency limitations of a system such as the example system 100 of FIG. 1.

FIG. 4 is a flowchart depicting an example process 400 that may be performed by the example interrupt event handler of FIG. 3. Initially, the process 400 determines if the calculations associated with the new or updated configuration information are done or complete (block 402). If the calculations are not done, the process 400 calculates additional new or updated configuration data (block 404). After calculating data at block 404, the process 400 determines if a predetermined period of time has expired or elapsed (block 406). The predetermined time period may correspond to a maximum desired or permissible latency time associated with the OS of the processor system to which the configuration change or update relates (e.g. the system 100 of FIG. 1). If the predetermined time period has not elapsed (block 406), the process 400 determines if any of the data calculated at block 404 contains an error (e.g., a logic error) (block 410). If no error is detected (block 410), the process 400 enrolls or stores the data calculated at block 404 into the data buffer 304 (block 412) and returns control to block 402.

FIGS. 4 and 5 described in greater detail below depict a flowchart representative of an example method that may be used to implement the example apparatus 300 of FIG. 3. In some example implementations, the example method of FIGS. 4 and 5 may be implemented using machine readable instructions comprising a program for execution by a processor (e.g., the processor 612 shown in the example processor system 610 of FIG. 6). The program may be embodied in software stored on a tangible medium such as a CD-ROM, a floppy disk, a hard drive, a digital versatile disk (DVD), or a memory associated with the processor 612 and/or embodied in firmware and/or dedicated hardware in a well-known manner. Further, although the example program is described with reference to the flowchart illustrated in FIGS. 4 and 5, persons of ordinary skill in the art will readily appreciate that many other methods of implementing the example apparatus 300 may alternatively be used. For example, the order of execution of the blocks may be changed, and/or some of the blocks described may be changed, eliminated, or combined.

If the process 400 determines that the predetermined time period has expired or lapsed at block 406, the process 400 schedules another SMI to subsequently retrigger the interrupt event handler 302 and, thus, the process 400 (block 408). After scheduling another interrupt at block 408, the process 400 sets a HOLD flag to indicate that the partial configuration change or update data stored in the buffer 304 is to be held or saved (block 416).

If the process 400 detects an error at block 410, then a CLEAR flag is set (block 414) to indicate that the contents of the buffer 304 are not to be used to change or update the configuration of the system 100. If the process 400 determines at block 402 that the calculations associated with the configuration change or update are done or complete, then the process 400 sets a CALCULATE DONE flag (block 418) which, as described below in more detail in connection with FIG. 5, causes the configuration update handler 306 to apply the configuration data. After setting one of the flags in block 414, 416, or 418, the process 400 ends and/or returns control to, for example, the OS of the system 100 (block 420).

FIG. 5 is a flowchart depicting an example process 500 that may be performed by the example configuration update handler 306 of FIG. 3. The process 500 monitors the status of the CALCULATE DONE flag at block 502 and, if the flag indicates that the calculations to be performed by the interrupt event handler 302 are complete (e.g., the CALCULATE DONE flag is set), the process 500 forces the system 100 into a quiesce state (block 504). The process 500 then applies the updated configuration data to the hardware devices of the system 100 by, for example, extracting and applying the data from the buffer 304 in the order in which it was enrolled or stored in the buffer 304 (block 506). Following the application of the data at block 506, the process 500 causes the system 100 to quit, cease, or exit the quiesce state (block 508) and then clears the data buffer 304 (block 510) before ending the process 500 and/or returning control to the OS of the system 100 (block 518).

If the process 500 determines that the calculations associated with the configuration update or change are not complete at block 502 and that the HOLD flag is not set (block 512), the process 500 clears the buffer 304 without updating or applying the data in the buffer 304 (block 516) and ends the process 500 and/or returns control to the OS (block 518). Otherwise, if the process 500 determines that the HOLD flag is set at block 512, the process 500 holds the partially complete configuration change or update data in the buffer 304 (block 514) and then ends the process 500 and/or returns control to the OS (block 518).

Figure 6:
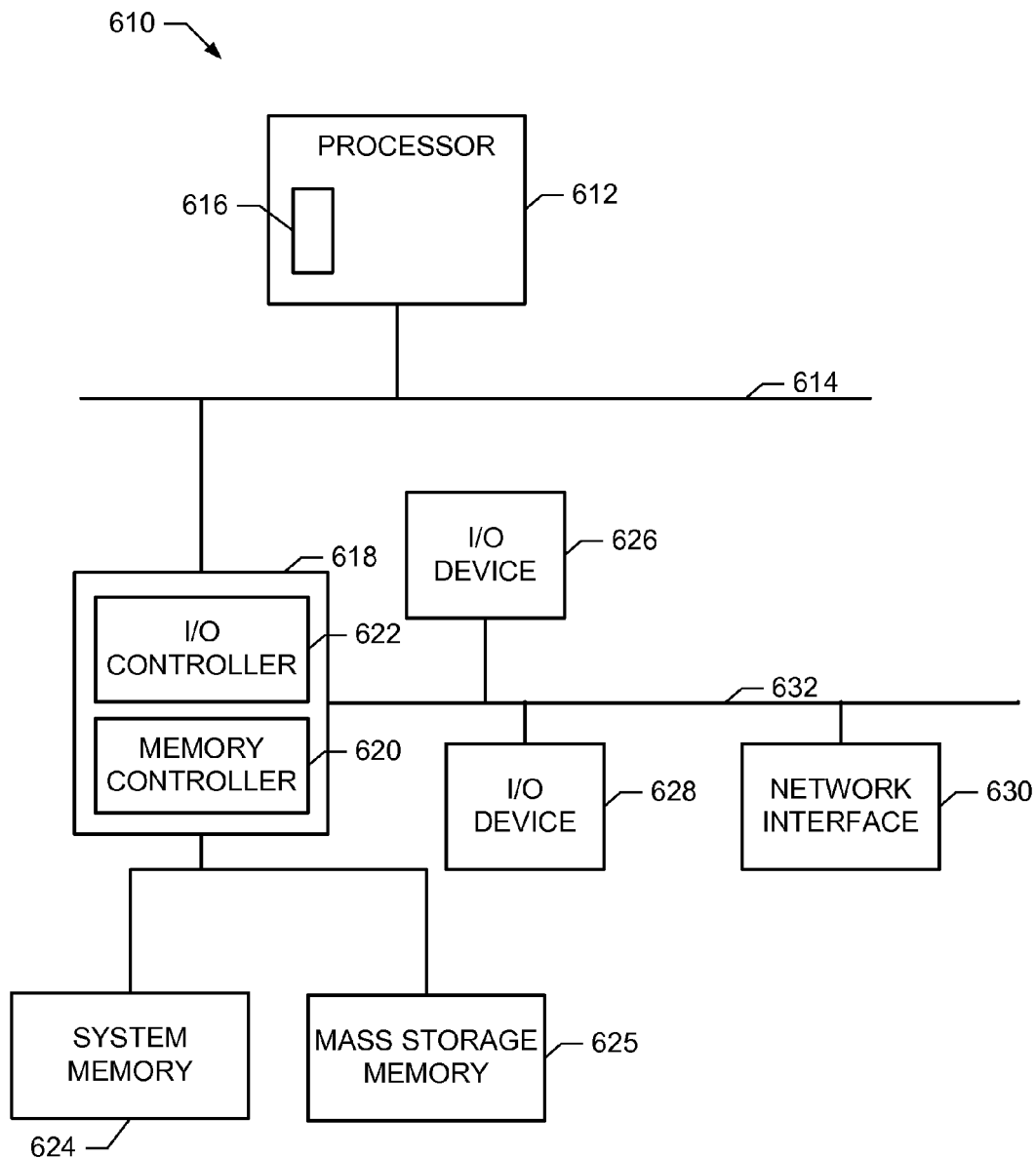
FIG. 6 is a block diagram of an example processor system that may execute the example method represented by FIGS. 4 and 5 to implement the example apparatus of FIG. 3.

FIG. 6 is a block diagram of an example processor system 610 that may be used to implement the apparatus and methods described herein. As shown in FIG. 6, the processor system 610 includes a processor 612 that is coupled to an interconnection bus 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection bus 614. The processor 612 may be any suitable processor, processing unit or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. As is well known, a chipset typically provides I/O and memory management functions as well as a plurality of general purpose and/or special purpose registers, timers, etc. that are accessible or used by one or more processors coupled to one or more chipsets 618. The memory controller 620 performs functions that enable the processor 612 (or processors if there are multiple processors) to access a system memory 624 and a mass storage memory 625.

The system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a DSL modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
calculating system configuration data during a non-quiesce state of a processing system;
storing information based on the calculated system configuration data in a data buffer during the non-quiesce state of the processing system;

extracting information from the data buffer to update the configuration of the processing system while the processing system is in a quiesce state; and clearing the information stored in the data buffer in response to identifying an error in the calculated system configuration data.

2. The method as defined in claim 1, wherein calculating the system configuration data comprises calculating the system configuration data in response to an interrupt event associated with the processing system.

3. The method as defined in claim 1, further comprising halting the calculating of the system configuration data and the storing of the information in a response to a lapse of a predetermined time and scheduling an interrupt.

4. The method as defined in claim 3, further comprising continuing the calculating of the system configuration data and the storing of the information in the response to execution of the interrupt.

5. The method as defined in claim 1, wherein extracting the information form the data buffer to update the configuration of the processing system while the processing system is in a quiesce state comprises updating the configuration of the processing system in response to a completion of the calculating of the system configuration data.

6. The method as defined in claim 1, wherein the processing system is a link-based multiprocessor system.

7. The method as defined in claim 1, wherein the processing system is further configured to implement a platform management interrupt.

8. An apparatus comprising:
an event handler to calculate system configuration data during a non-quiesce state of a processing system and store information based on the calculated system configuration data in a data buffer during the non-quiesce state of the processing system; and a configuration update handler to extract information from the data buffer to update the configuration of the processing system while the processing system is in a quiesce state, wherein the event handler is to halt the system configuration data calculation and store the information in response to a lapse of a predetermined time and to schedule an interrupt to continue the system configuration data calculation, wherein at least one of the event handler or the configuration update handler is stored on a tangible computer readable storage medium.

9. The apparatus as defined in claim 8, wherein the event handler is to calculate the system configuration data in response to an interrupt event associated with the processing system.

10. The apparatus as defined in claim 8, wherein the event handler is to clear the information stored in the data buffer in response to identifying an error in the calculated system configuration data.

11. The apparatus as defined in claim 8, wherein the event handler is to transmit the information to the data buffer in response to determining the calculated system configuration data does not contain an error.

12. The apparatus as defined in claim 8, wherein the configuration update handler is to extract the information from the data buffer and initiate a quiesce state to update the configuration of the processing system.

13. The apparatus as defined in claim 8, wherein the configuration update handler is to apply the calculated system configuration data and clear the data buffer before releasing the processing system from the quiesce state.

14. An article of manufacture comprising a tangible computer readable medium storing machine accessible instructions which, when executed, cause a machine to:
calculate system configuration data during a non-quiesce state of a processing system and store information based on the calculated system configuration data in a data buffer during the non-quiesce state of the processing system, wherein the system configuration is to be calculated in response to an interrupt event associated with the processing system; and extract information from the data buffer to update the configuration of the processing system while the processing system is in a quiesce state.

15. The article of manufacture as defined in claim 14, wherein the instructions, when executed, cause a machine to halt the system configuration data calculation and store the information in response to a lapse of a predetermined time and to schedule an interrupt to continue the system configuration data calculation.

16. The article of manufacture as defined in claim 14, wherein the instructions, when executed, cause a machine to clear the information stored in the data buffer in response to identifying an error in the calculated system configuration data.

17. The article of manufacture as defined in claim 14, wherein the instructions, when executed, cause a machine to transmit the information to the data buffer in response to determining the calculated system configuration data does not contain an error.

18. The article of manufacture as defined in claim 14, wherein the instructions, when executed, cause a machine to extract the information from the data buffer and initiate a quiesce state to update the configuration of the processing system.

19. The article of manufacture as defined in claim 14, wherein the instructions, when executed, cause a machine to apply the calculated system configuration data and clear the data buffer before releasing the processing system from the quiesce state.

* * * * *

UNITED STATES PATENT AND TRADEMARK OFFICE
CERTIFICATE OF CORRECTION

PATENT NO. : 7,640,453 B2 Page 1 of 1
APPLICATION NO. : 11/618422
DATED : December 29, 2009
INVENTOR(S) : Li et al.

It is certified that error appears in the above-identified patent and that said Letters Patent is hereby corrected as shown below:

Col. 7, Line 20: replace "information form" with --information from--.

Signed and Sealed this

Twenty-third Day of March, 2010

David J. Kappos
*Director of the United States Patent and Trademark Office*